United States Patent
Wanser et al.

(10) Patent No.: US 10,355,930 B2
(45) Date of Patent: Jul. 16, 2019

(54) SYSTEM AND METHOD OF SUBNETTING A VIRTUAL NETWORK IDENTIFIER

(71) Applicant: FORTINET, Inc., Sunnyvale, CA (US)

(72) Inventors: Kelly Ann Wanser, San Francisco, CA (US); Andreas Markos Antonopoulos, San Francisco, CA (US)

(73) Assignee: Fortinet, Inc., Sunnyvale, CA (US)

( * ) Notice: Subject to any disclaimer, the term of this patent is extended or adjusted under 35 U.S.C. 154(b) by 202 days.

(21) Appl. No.: 14/210,069

(22) Filed: Mar. 13, 2014

(65) Prior Publication Data

US 2014/0337497 A1    Nov. 13, 2014

Related U.S. Application Data

(60) Provisional application No. 61/783,757, filed on Mar. 14, 2013.

(51) Int. Cl.
*H04L 12/24* (2006.01)
*H04L 12/46* (2006.01)

(52) U.S. Cl.
CPC ...... *H04L 41/0866* (2013.01); *H04L 12/4633* (2013.01); *H04L 12/4645* (2013.01); *H04L 41/0893* (2013.01)

(58) Field of Classification Search
CPC ............. H04L 41/0866; H04L 12/4645; H04L 41/0893; H04L 12/4633
See application file for complete search history.

(56) References Cited

U.S. PATENT DOCUMENTS

| | | |
|---|---|---|
| 9,411,787 B1 | 8/2016 | Lad et al. |
| 9,954,736 B2 | 4/2018 | Durgin et al. |
| 2003/0212941 A1 | 11/2003 | Gillies et al. |
| 2005/0207411 A1 | 9/2005 | Ota et al. |
| 2006/0104286 A1 | 5/2006 | Cheriton |
| 2007/0088834 A1 | 4/2007 | Litovski et al. |
| 2007/0268909 A1 | 11/2007 | Chen et al. |
| 2009/0185501 A1 | 7/2009 | Huang et al. |

(Continued)

FOREIGN PATENT DOCUMENTS

WO     2016/089921     6/2016

*Primary Examiner* — Chris Parry
*Assistant Examiner* — Soe M Hlaing
(74) *Attorney, Agent, or Firm* — Jaffery Watson Mendonsa & Hamilton LLP

(57) ABSTRACT

A method and apparatus that determines a plurality of matching policies for a segment of a dynamic virtualized network is described. A device retrieves a virtual network identifier of the segment, where the virtual network identifier includes a plurality of bits and a plurality of subnets and each of the plurality of subnets is a different subset of the plurality of bits. In addition, the dynamic virtualized network is a virtualized layer 2 network that is overlaid on a layer 3 physical network, where the layer 3 physical network includes a plurality of network access devices, and the segment includes a plurality of endpoints. The device further determines the plurality of matching policies for the segment from the plurality of subnets of the virtual network identifier, where each of the plurality of subnets corresponds to one of the plurality of matching policies. The device additionally applies the plurality of matching policies to each network access device that corresponds to one of the plurality of matching endpoints.

20 Claims, 14 Drawing Sheets

(56) References Cited

U.S. PATENT DOCUMENTS

| | | |
|---|---|---|
| 2010/0071024 A1* | 3/2010 | Eyada ................ H04L 63/0263 |
| | | 726/1 |
| 2010/0281051 A1 | 11/2010 | Sheffi et al. |
| 2011/0261706 A1 | 10/2011 | Fujiwara et al. |
| 2013/0022042 A1 | 1/2013 | Vasseur et al. |
| 2013/0088959 A1 | 4/2013 | Kamath et al. |
| 2013/0259054 A1 | 10/2013 | Yoneyama |
| 2013/0297768 A1* | 11/2013 | Singh ................ H04L 12/2602 |
| | | 709/224 |
| 2013/0311832 A1 | 11/2013 | Lad et al. |
| 2014/0019203 A1 | 1/2014 | Sundaram et al. |
| 2014/0056317 A1 | 2/2014 | Sanders et al. |
| 2014/0161131 A1* | 6/2014 | Yang .................... H04L 45/54 |
| | | 370/401 |
| 2015/0092591 A1 | 4/2015 | Matthews et al. |
| 2015/0281028 A1 | 10/2015 | Akhter et al. |
| 2016/0080269 A1 | 3/2016 | Akiya et al. |
| 2016/0164734 A1 | 6/2016 | Durgin et al. |
| 2016/0164741 A1 | 6/2016 | Durgin et al. |
| 2016/0021017 A1 | 9/2016 | Thubert et al. |
| 2017/0063705 A1 | 3/2017 | Gilson et al. |
| 2017/0272693 A1 | 9/2017 | Strein |
| 2017/0302580 A1 | 10/2017 | Luo et al. |

\* cited by examiner

SYSTEM AND METHOD OF SUBNETTING A VIRTUAL NETWORK IDENTIFIER

RELATED APPLICATIONS

Applicant claims the benefit of priority of prior, provisional application Ser. No. 61/783,757 filed Mar. 14, 2013, the entirety of which is incorporated by reference.

FIELD OF INVENTION

This invention relates generally to data networking and more particularly to subnetting a virtual network identifier of a dynamic virtualized network that is overlaid on a physical network.

BACKGROUND OF THE INVENTION

A virtualized network is a data network that is overlaid on the top of another network, such as a physical network. Network elements in the overlaid network are connected by virtual or logical links, each of which corresponds to a path, perhaps through many physical links, in the underlying network. For example, a virtualized network is a combination of hardware and software network resources that is a single administrative entity.

One example of a virtualized network is Virtual eXtensible Local Area Network (VXLAN), where VXLAN is a layer 2 overlay over a layer 3 physical network. Each VXLAN overlay network is known as a VXLAN segment and is identified by a unique 24-bit segment ID called a VXLAN Network Identifier (VNI). Virtual machines with the same VNI are allowed to communicate with each other over the corresponding VXLAN segment. In a VXLAN segment, virtual machines are uniquely identified by the combination of Media Access Control (MAC) addresses and the VNI of that segment. A Virtual Tunnel Endpoint (VTEP) encapsulates data entering the VXLAN segment with the VNI and de-encapsulates the data traffic leaving the VXLAN segment.

An operator typically assigns the VNI to VXLAN segments in a haphazard fashion. For example, an operator may assign a VNI of 5024 for a general desktop VXLAN, a VNI of 5026 for a general server VXLAN, and a VNI of 5027 for a VXLAN that supports branch desktops. By assigning the VNIs for the different VXLAN in a haphazard fashion, it is hard to map a policy for each VXLAN segment using the VNI. A lookup table matching VNI to policy can be implemented, but this only maps the VNI to policy and does not allow for a hierarchical structure of policy assignment.

SUMMARY OF THE DESCRIPTION

A method and apparatus that determines a plurality of matching policies for a segment of a dynamic virtualized network is described. A device retrieves a virtual network identifier of the segment, where the virtual network identifier includes a plurality of bits and a plurality of subnets and each of the plurality of subnets is a different subset of the plurality of bits. In addition, the dynamic virtualized network is a virtualized layer 2 network that is overlaid on a layer 3 physical network, where the layer 3 physical network includes a plurality of network access devices, and the segment includes a plurality of endpoints. The device further determines the plurality of matching policies for the segment from the plurality of subnets of the virtual network identifier, where each of the plurality of subnets corresponds to one of the plurality of matching policies. The device additionally applies the plurality of matching policies to each network access device that corresponds to one of the plurality of matching endpoints.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
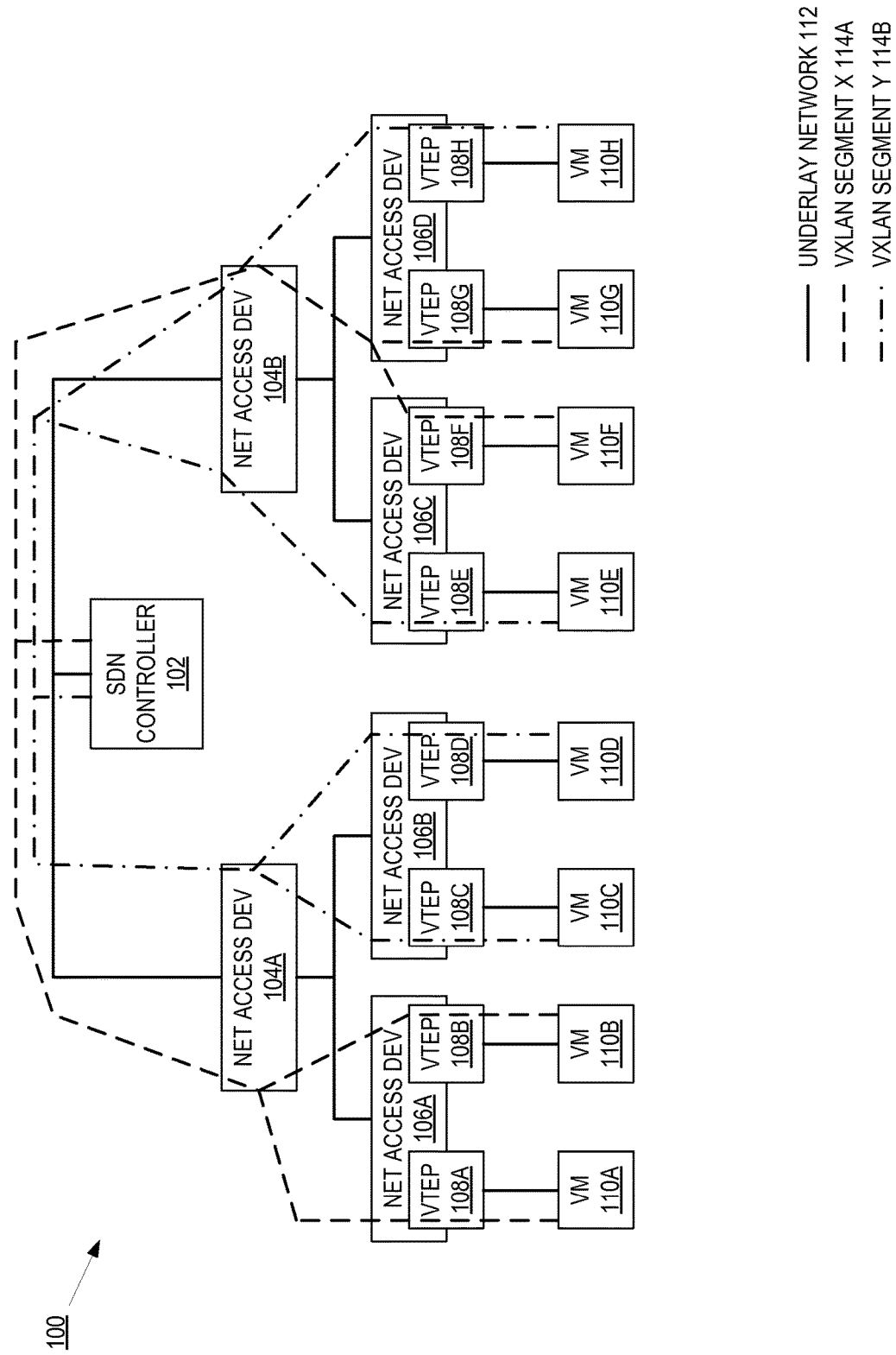
FIG. 1 is a block diagram of one embodiment of a system that includes dynamic virtualized networks overlaid on an underlay physical network.

A method and apparatus that determines a plurality of matching policies for a segment of a dynamic virtualized network is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus that determines a plurality of matching policies for a segment of a dynamic virtualized network is described. In one embodiment, the device retrieves a VNI for a VXLAN segment, where the VNI is represented as a dotted decimal number, instead of as a single decimal. This dotted decimal number represents a hierarchical set of numbers, such as A.B.C. In addition, this VNI can be mapped to one or more policies from a hierarchical set of policies. Each of the policies for a VXLAN segment is a set of rules or configurations that indicates how a network data for that VXLAN is to be processed and/or tracked. In addition, a VXLAN segment policy can also indicate how a network access device that participates in this VXLAN is to be managed. This set of policies can be used for VXLAN segments of a single tenant, such as a corporation, or can be used for VXLAN segments of multiple tenants, such as for government and non-government tenants. The hierarchical set of policies can be organized as a top-level root policy that is applicable to each available VNI with one or more sub-policies. For example, a policy can include a root policy that applies to every VXLAN segment, a policy that applies to VXLAN segment(s) that are used for desktop computers, a policy for VXLAN segment(s) that are used for servers, a policy for VXLAN segment(s) that are used for branch desktop computers, and a policy for VXLAN segment(s) that are used for trading servers.

To determine which of these policies apply for a VNI, the VNI can be represented as a dotted decimal number, in which each of the numbers corresponds to a different subnet of the VNI. In this embodiment, the VNI is a plurality of bits (e.g., 24-bits) and each of the subnets is a different subset of the VNI bits. In one embodiment, subnetting of the VNI allows for an operator to ascertain which of the different subnets that a VNI belongs to. In addition, the subnetting concept allows an operator to assign a VNI for a particular type of VXLAN segment and corresponding set of policies (e.g., a general policy, policy for desktop type VXLAN, policy for server type VXLAN, etc.).

In addition, the device can determine a plurality of matching policies for a VNI of a given VXLAN segment. This allows the operator to provision a VXLAN segment with an assigned a VNI and have the device determine which of the VXLAN segment policies are to be applied to the network access devices that participate in this VXLAN. In one embodiment, the device walks through the hierarchical set of policies and applies a mask corresponding to one of policies to the VNI. If the mask indicates a match, this policy is applied for this VXLAN segment.

FIG. 1 is a block diagram of one embodiment of a system 100 that includes dynamic virtualized networks 114A-B that are overlaid on an underlay physical network 112. In FIG. 1, two virtualized networks, VXLAN 114A-B, are overlaid on top of an underlying physical network 112. In another embodiment, a virtualized network can be overlaid on top of another virtualized network. In one embodiment, this physical network 112 is a network that includes network access devices 104A-B that interconnects other network access devices 106A-D. In one embodiment, network access devices 106A-B is coupled to network access device 104A. Network access device 104A is further coupled to network access device 104B, which is in turn coupled to network access device 106A-B. In one embodiment, a network access device is a device that provides network access to a network (e.g., physical network, virtualized network, etc.). A network access device can be a switch, router, hub, bridge, gateway, etc., or any type of device that can allow access to a network. While in one embodiment the interconnection between the different network access devices is a wired connection (e.g., copper, fiber, etc., and/or a combination thereof), in alternate embodiments, a different type of interconnection is used (e.g., wireless, a combination of wireless and wired, etc.). In one embodiment, the physical network 112 is layer 3 network, in which the network access devices 104A-B and 106A-D are communicating data using a layer 3 protocol (e.g., Internet Protocol (IP), Asynchronous Transfer Mode (ATM), etc.) or a combination of layer 3 protocol and another layer protocol (e.g., Ethernet switching, Infiniband, Ethernet routing, multiprotocol layer switching (MPLS), Synchronous Optical Networking (SONET), Satellite networking protocols, etc.). For example and in one embodiment, the physical network 112 is a layer 3 IP network interconnected by copper and/or fiber Ethernet connections. While in one embodiment, network access devices 104A-B are connected by a local area network (LAN), in alternate embodiments the coupling between the network access devices 104A-B is different (e.g. coupled by multiple links that have the same or different physical media and protocols, coupled a wide area network, etc.).

In FIG. 1, two VXLAN segments 114A-B are overlaid the physical network 112. As described above, each VXLAN segment 114A-B is a layer 2 network overlaid over a layer 3 physical network. Each VXLAN segment is identified by a unique 24-bit segment ID called a VXLAN Network Identifier (VNI). Virtual machines with the same VNI are allowed to communicate with each other over the corresponding VXLAN segment. Virtual machines that are coupled to the VXLAN segment are identified uniquely by the combination of their MAC addresses and VNI. A Virtual Tunnel Endpoint (VTEP) encapsulates data entering the VXLAN segment and de-encapsulates the data traffic leaving the VXLAN segment. In one embodiment, each VTEP enforces a network security policy to the network data being communicated through that VTEP. In one embodiment, a network automation engine generates and applies a network security policy for each VTEP as described in FIG. 3 below.

In one embodiment, the network access device 106A-D includes the VTEPs 108A-H that are used encapsulate/de-encapsulate network data communicated with virtual machines (VM) 110A-H. In one embodiment, a virtual machine is a software implementation of a machine (e.g. a computer, switch, etc.) that executes programs like a physical machine. The virtual machine can be a system virtual machine that provides a virtualized operating system platform to run one or more applications (e.g., hardware virtualization). In another embodiment, the virtual machine represents a plurality of virtual machines that are coupled to the same VXLAN segment via the same VTEP. In a further embodiment, the virtual machine represents one or more physical and/or virtual devices that communicate network data through the corresponding VTEP (e.g., the VM could represent a physical device, a switch or other network access device, a firewall, etc. and/or a combination thereof).

In one embodiment, the Software Defined Network (SDN) controller 102 is a device that has the VTEP configurations for each VXLAN segment. In one embodiment, the VTEP configuration includes which VTEP are authorized for each VXLAN segment and where the VTEP are located (e.g., the port and network access device where that VTEP is located).

In addition, VXLAN segments 114A-B use multicast to transport virtual machine originated traffic such as unknown destination MAC packets, broadcasts, multicast or non-IP traffic. In addition, multicast is used for endpoint discovery by the VTEPs. Physical switches further use multicast snooping to build a map of the physical ports to multicast addresses in use by the end clients.

While in one embodiment, there are two VXLAN segments 114A-B illustrated in FIG. 1, in alternate embodiments, there can more or less VXLAN segments. In one embodiment, VXLAN segment 114A couples VMs 110A, 110B, 110F, and 110G so that these VMs can communicate using a layer 2 protocol. In this embodiment, VMs 110A-B couple to network access device 106A via VTEP 108A-B, respectively. In addition, VM 110F couples to network access device 106C via VTEP 108F and VM 110G couples to network access device 106D via VTEP 108G. By coupling VMs 110A, 110B, 110F, and 110G using VXLAN segment 114A, these VMs can communicate using a layer 2 protocol over a local or wide area network.

In one embodiment, the VMs 110A, 110B, 110F, and 110G dynamically couple to the VXLAN segment 114A using a corresponding VTEPs 108A, 108B, 108F, and 108G. In this embodiment, as one of the VMs 110A, 110B, 110F, and 110G is provisioned, that VM couples to the corresponding VTEP. That VTEP discovers the newly provisioned VM and allows the provisioned VM to communicate on that VXLAN segment. In one embodiment, the network data communicated using VXLAN segment 114A is encapsulated with a header that includes the VNI associated with VXLAN segment 114A.

In one embodiment, the VXLAN segment 114A is dynamic because the VMs coupled to the VXLAN segment can join or leave the VXLAN segment using a multicast join or leave message. For example and in one embodiment, VM 110A joins the VXLAN segment 114A by sending an IGMP join message to the SDN controller 102. In response, network access devices 106A and 104A, and SDN controller 102 save information in the respective tables that VM 110A is part of VXLAN segment 114A.

In one embodiment, VXLAN segment 114B couples VMs 110C, 110D, 110E, and 110H so that these VMs can communicate using a layer 2 protocol. In this embodiment, VMs 110C-D couple to network access device 106B via VTEP 108C-D, respectively. In addition, VM 110E couples to network access device 106C via VTEP 108E and VM 110H couples to network access device 106D via VTEP 108H. By coupling VMs 110C, 110D, 110E, and 110H using VXLAN segment 114B, these VMs can communicate using a layer 2 protocol over a local or wide area network. In addition, VMs 110C, 110D, 110E, and 110H dynamically couple to the VXLAN segment 114B. In one embodiment, the network data communicated using VXLAN segment 114B is encapsulated with a header that includes the VNI associated with VXLAN segment 114B.

In one embodiment and similar to VXLAN segment 114A, the VXLAN segment 114B is a dynamic virtualized network because the VMs coupled to this VXLAN segment 114B can join or leave this VXLAN segment using a multicast join or leave message. For example and in one embodiment, VM 110C joins the VXLAN segment 114B by sending an IGMP join message to the SDN controller 102. In response, network access devices 106A and 104B and SDN controller 102 save information in the respective tables that VM 110A is part of VXLAN segment 114A.

In the VXLAN segments 114A-B illustrated in FIG. 1, some of the networks access devices 104A-B and 106 A-D participate in one or both of the VXLAN segments. For example and in one embodiment, network access device 106A and 106B participate in one VXLAN segment (VXLAN segments 114A and 114B, respectively). In addition, network access devices 104A-B and 106C-D participate in both VXLAN segments 114A-B. In one embodiment, network access device 104A-D include VTEPs 108A-H to encapsulate/de-encapsulate network data being communicated with the respective VMs 108A-H. In one embodiment, the network access devices 106A-B communicate VXLAN encapsulated traffic for both VXLAN segments 114A-B, but neither of these network access devices includes a VTEP used to couple to a VM. In this embodiment, network access devices 106A-B are used to transit VXLAN segment network data between the corresponding VMs 108A-H and is not used to terminate a VXLAN segment. While the system 100 in FIG. 1 is described in reference to a VXLAN network, the invention described herein can be used for other virtualized networks (e.g., NVGRE, STT, and OTV).

Figure 2:
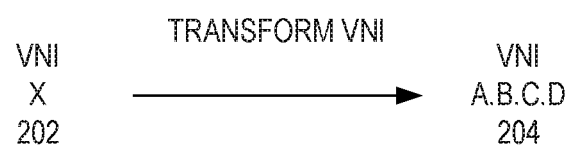
FIG. 2 is an illustration of one embodiment of converting a single decimal virtual network identifier to a dotted virtual network identifier notation.

As described above, each VXLAN segment is identified by a unique 24-bit segment VNI. Virtual machines with the same VNI are allowed to communicate with each other over the corresponding VXLAN segment. Virtual machines that are coupled to the VXLAN segment are identified uniquely by the combination of their MAC addresses and VNI. FIG. 2 is an illustration of one embodiment of converting a single decimal VNI 202 to a dotted VNI notation 204. In one embodiment, the VNI is a 24-bit identifier and can be represented in many different representations. In one embodiment, the VNI 202 is represented as a single integer, X. For example and in one embodiment, VNI 202 can be represented as VNI 5000 or 10002. In another embodiment, the VNI is represented as a dotted decimal that which can consist of multiple decimal numbers separated by ".", with each decimal number having a range that depends on how the VNI subdivided. For example and in one embodiment, the dotted decimal VNI A.B.C 204 includes three decimal numbers, with each number representing eight bits of the VNI and ranging from 0 to 255 separated by dots, e.g., 32.16.9. In another embodiment, there can be more or less numbers in the dotted decimal number. For example and in one embodiment, a VNI can be represented as a dotted decimal number of four numbers, where each number is a six-bit number.

In one embodiment, a dotted decimal VNI can allow an operator to assign a new VNI value for a VXLAN segment based on a hierarchical set of policies, such that the correct policies for the VXLAN segment are assigned based on the VNI value. In this embodiment, the dotted decimal notation allows an operator to visualize the boundaries between the ranges of the VNI values and to see the hierarchical structure of the VNI. In one embodiment, a corporation has VXLAN segments for desktop computers and servers. In this embodiment, the VXLAN segments for desktop computers are in the range of 1.1.* and the server VXLAN segments are in the range of 1.2.*. In an operator wishes to create a new VXLAN segment for branch desktops, the operator can assign an unused VNI in the range of 1.1.*, such as 1.1.5. As will be described below, a network automation engine can retrieve this VNI and assign specific policies for related to this VXLAN segment based on a VNI of 1.1.5. For example and in one embodiment, the network automation engine can assign policies such as an overall network policy and policies specific for desktop and branch desktop VXLAN segments to the network access devices that participate in this VXLAN segment.

Figure 3:
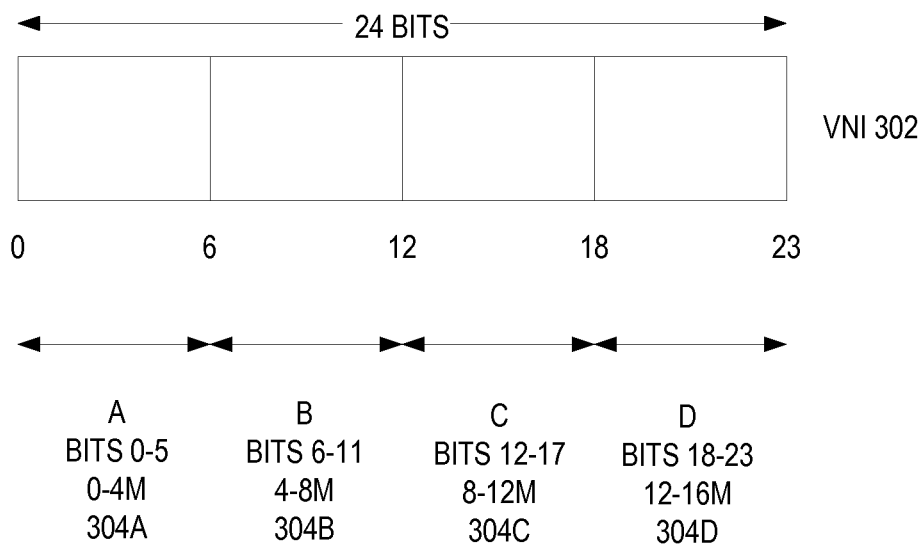
FIG. 3 is a block diagram of one embodiment of a subdivision of a virtual network identifier.

As described above, a VNI can be represented using a dotted decimal notation. In one embodiment, the number of decimals used and the ranges of each of the decimals depend on how the bits in the VNI are subdivided. FIG. 3 is a block diagram of one embodiment of a subdivision of a virtual network identifier 302. In one embodiment, the VNI 302 is a 24-bit identifier. In this embodiment, the VNI 302 is subdivided into four distinct and non-overlapping partitions 304A-D. For example and in one embodiment, partition 304A includes bits 0-5, partition 304B includes bits 6-11, partition 304C includes bits 12-17, and partition 304D includes bits 18-23. In this embodiment, partition 304A is used for VNI identifiers with a value between 0-4 million, partition 304B is used for VNI identifiers with a value between 4-8 million, partition 304C is used for VNI identifiers with a value between 8-12 million, and partition 304D is used for VNI identifiers with a value between 12-16 million. By splitting this VNI number space into distinct non-overlapping buckets, it is hard to map a set of hierarchical policies to this number partition scheme.

Figure 4:
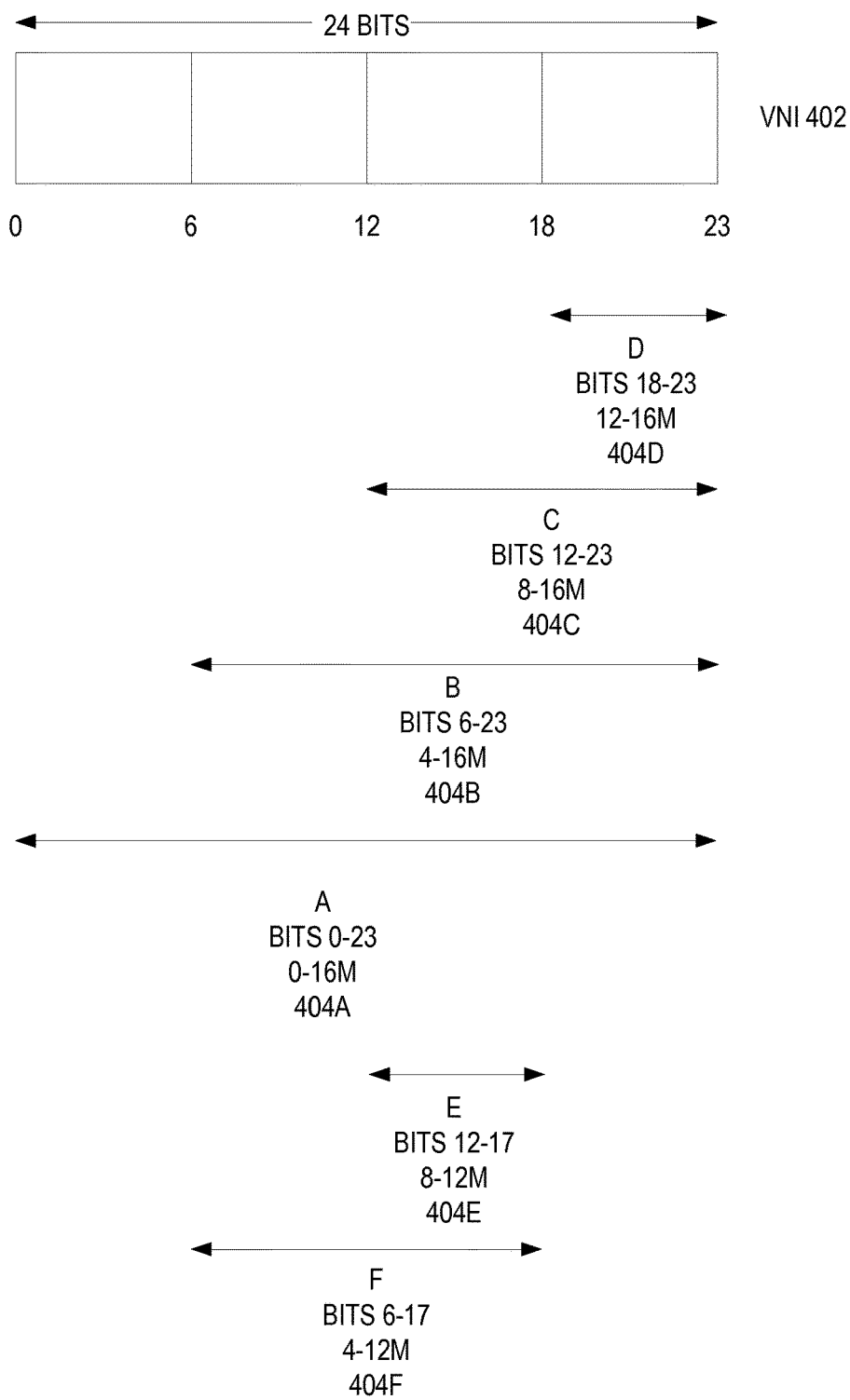
FIG. 4 is a block diagram of one embodiment of a hierarchical subnetting of a virtual network identifier.

Instead of partitioning a VNI number space into multiple non-overlapping partitions as described in FIG. 3 above, the VNI number space can be partitioned into a number of hierarchical subnets. Each of these subnets is a different subset of the VNI number space. The subset can be all of the number space or part of the number space. FIG. 4 is a block diagram of one embodiment of a hierarchical subnetting of a virtual network identifier 402. In one embodiment, the VNI 402 is a 24-bit identifier and is subdivided into four hierarchical partitions 404A-D. In one embodiment, each of the partitions 404A-D includes the right most bit of the VNI 402. The difference between the partitions is the number of bits each partition includes. In this embodiment, partition 404A includes all 24 bits and is the top-level partition. Because partition 404A includes all 24 bits (bits 0-23), partition 404A encompasses the 16 million possible addresses for the VNI 402. Partition 404B includes bits 6-23 and is the next level partition for the VNI 402. This partition 404B encompasses VNI values between four and sixteen million. Partition 404C includes bits 12-23 and is the third level partition for the VNI 402. This partition 404C encompasses VNI values between eight and sixteen million. The bottom-level partition 404D includes bits 18-23 and is the fourth level partition for the VNI 402. This partition 404D encompasses VNI values between twelve and sixteen million. In this embodiment, and with this subnetting, the VNI 402 can be represented using a dotted decimal number A.B.C.D, where each of the number of the decimals.

Partitions 404A-D illustrate a hierarchical partitioning of the VNI 402 into different levels, where each sub-level is encompassed by the level above that sub-level. In one embodiment, the VNI 402 can further be subdivided into partitions that are not completely in a hierarchical fashion. For example and in one embodiment, partitions 404E and 404F are partitions that are not encompassed nor encompass by lower-level partitions 404C or 404D. In addition, partition 404E includes bits 12-17 and encompasses VNI values between eight and twelve million. In particular, partition 404F includes bits 6-17 and encompasses VNI values between four and twelve million. In one embodiment, the lower 13 bits of the VNI is reserved for VLAN values (0-5000) and the upper bits are used for VXLAN VNIs.

Figure 5:
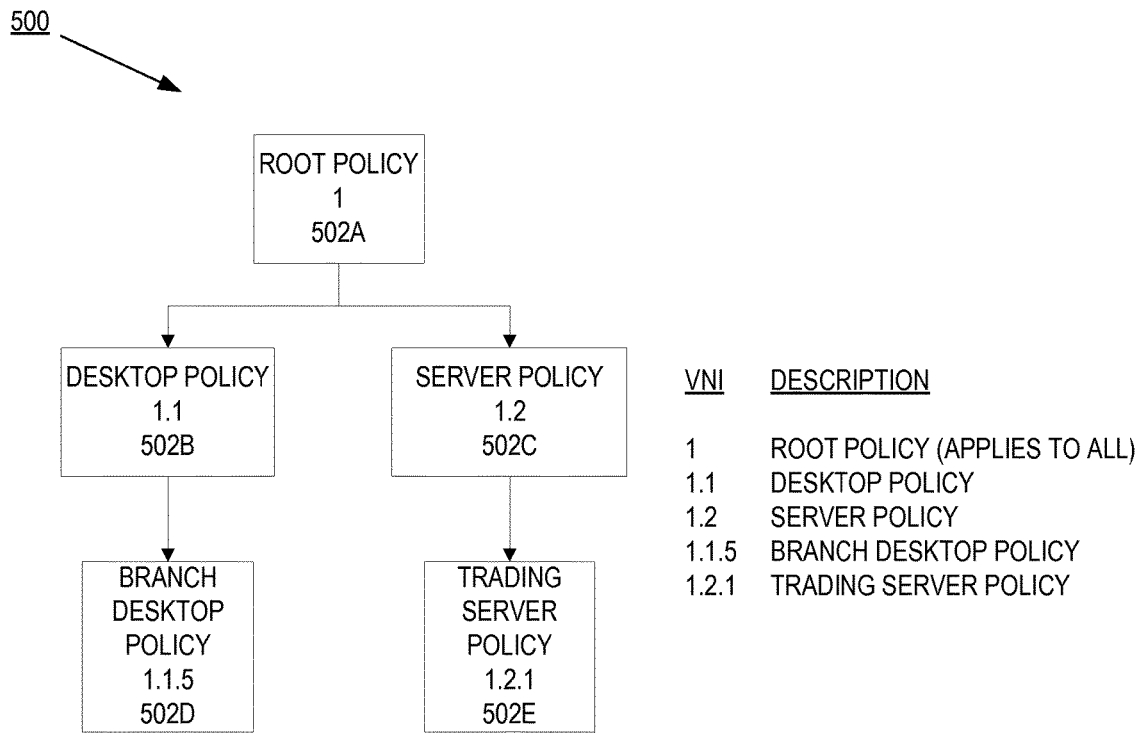
FIG. 5 is a block diagram of one embodiment of subnetted virtual network identifier policy for a single corporation.

By representing a VNI with a dotted decimal notation, a system administrator can setup a set of hierarchical policies that are applied based on the VNI for each VXLAN segment value. FIG. 5 is a block diagram of one embodiment of a subnetted VNI policy 500 for a single corporation. In FIG. 5, the subnetted VNI policy 500 includes a root policy 502A, a desktop policy 502B, a server policy 502C, branch desktop policy 502D, and trading server policy 502E. In one embodiment, a corporation has many different types of network segments within the network for the corporation. In this embodiment, the corporation has a central headquarters with severs remote branch offices and additional servers that are located in an offsite location. To support this corporation network configuration, a network is setup to connect the corporation headquarters with the branch offices and the offsite servers. In addition, the network supports different segments for corporate desktops, branch office desktops, servers, and offsite servers. The corporation, additionally, includes trading servers and servers in general.

In one embodiment, a policy for a VXLAN segment is a set of rules or configurations that indicate how a network data for that VXLAN is to be processed and/or tracked. In addition, a VXLAN segment policy can also indicate how a network access device that participates in this VXLAN is to be managed. In one embodiment, a policy can include an access control list (ACL) for one or more ports of a network access device, network access device forwarding decisions, applying a Quality of Service (QoS) or traffic shaping policy, setting a certain service level agreement for that VXLAN, blocking specific traffic patterns, a security policy on how the network data is processed, specifying maintenance times for participating network access devices, restricting configuration changes of network access devices or VXLAN policy unless approved by a certain person or level of authority, policy for virtual machine management, another policy that characterizes how the VXLAN network data is to be processed or managed, and/or how a network access device is configured and/or managed. For example and in one embodiment, an overall VXLAN segment policy can set QoS to be a best effort policy, whereas a policy for server VXLAN segment policy can set a minimum guaranteed bandwidth.

In FIG. 5, the VNI is a 24-bit number and is represented as a dotted decimal of three 8-bit numbers. In one embodiment, the root policy is the top-level policy that applies to all of the VNIs for this corporation. In this embodiment, the root policy is denoted as 1 and applies to the VXLAN segments with VNI in the range of 1.*.*. For example and in one embodiment, if the corporation had VXLAN segments 1.1.1, 1.1.5, 1.2.0, and 1.2.1, the root policy 502A would apply to each of these segments. For example and in one embodiment, the root policy for a corporation would be to apply a best effort quality of service for processing of network data for these VXLAN segments.

The root policy further includes to sub-policies: desktop policy 502B and sever policy 502C. In one embodiment, the desktop policy 502B is used for desktop machines (including branch office desktops and desktops in general) and this policy 502B is denoted as 1.1. In this embodiment, the desktop policy 502B applies to VXLAN segments in the range of 1.1.*. For example and in one embodiment, if the corporation had VXLAN segments 1.1.1, 1.1.5, 1.2.0, and 1.2.1, the desktop policy 502B would apply to the segments 1.1.1 and 1.1.5, but not segments 1.2.0 and 1.2.1. For example and in one embodiment, the desktop policy 502B for the corporation could be use a certain firewall for these VXLAN segments.

In one embodiment, the desktop policy 502B has one sub-policy which is the branch desktop policy 502D. In this embodiment, the branch desktop policy 502D is used for desktops that are part of the branch offices. The branch office desktop policy 502D is denoted 1.1.5 and applies to VXLAN segments a VNI of 1.1.5. For example and in one embodiment, if the corporation had VXLAN segments 1.1.1, 1.1.5, 1.2.0, and 1.2.1, the branch desktop policy 502D would apply to the segment 1.1.5, but not the segments 1.1.1, 1.2.0, and 1.2.1. For example and in one embodiment, the branch desktop policy 502D for the corporation would be to impose a maximum bandwidth (e.g., one gigabit/second) on the network traffic for this VXLAN segment.

In one embodiment, the server policy 502C is used for VXLAN segments that are for servers. In one embodiment, the server policy is denoted as 1.2 and applies to VXLAN segments in the range of 1.2.*. For example and in one embodiment, if the corporation had VXLAN segments 1.1.1, 1.1.5, 1.2.0, and 1.2.1, the server policy 502C would apply to the segments 1.2.0 and 1.2.1, but not segments 1.1.1 and 1.1.5. For example and in one embodiment, the server policy 502C for the corporation would be to guarantee a minimum bandwidth (e.g., one gigabit/second).

In one embodiment, the sever policy 502C has one sub-policy, trading server policy 502E, that is used for VXLAN segments that support trading servers. The trading server policy 502E is denoted 1.2.1 and applies to VXLAN segments with a VNI of 1.2.1. For example and in one embodiment, if the corporation had VXLAN segments 1.1.1, 1.1.5, 1.2.0, and 1.2.1, the trading server policy 502E would apply to the segment 1.2.1, but not the segments 1.1.1, 1.1.5.1, and 1.2.0. For example and in one embodiment, the trading server policy 502E for the corporation would be that the VXLAN segment is in Payment Card Industry (PCI) compliance.

Figure 6:
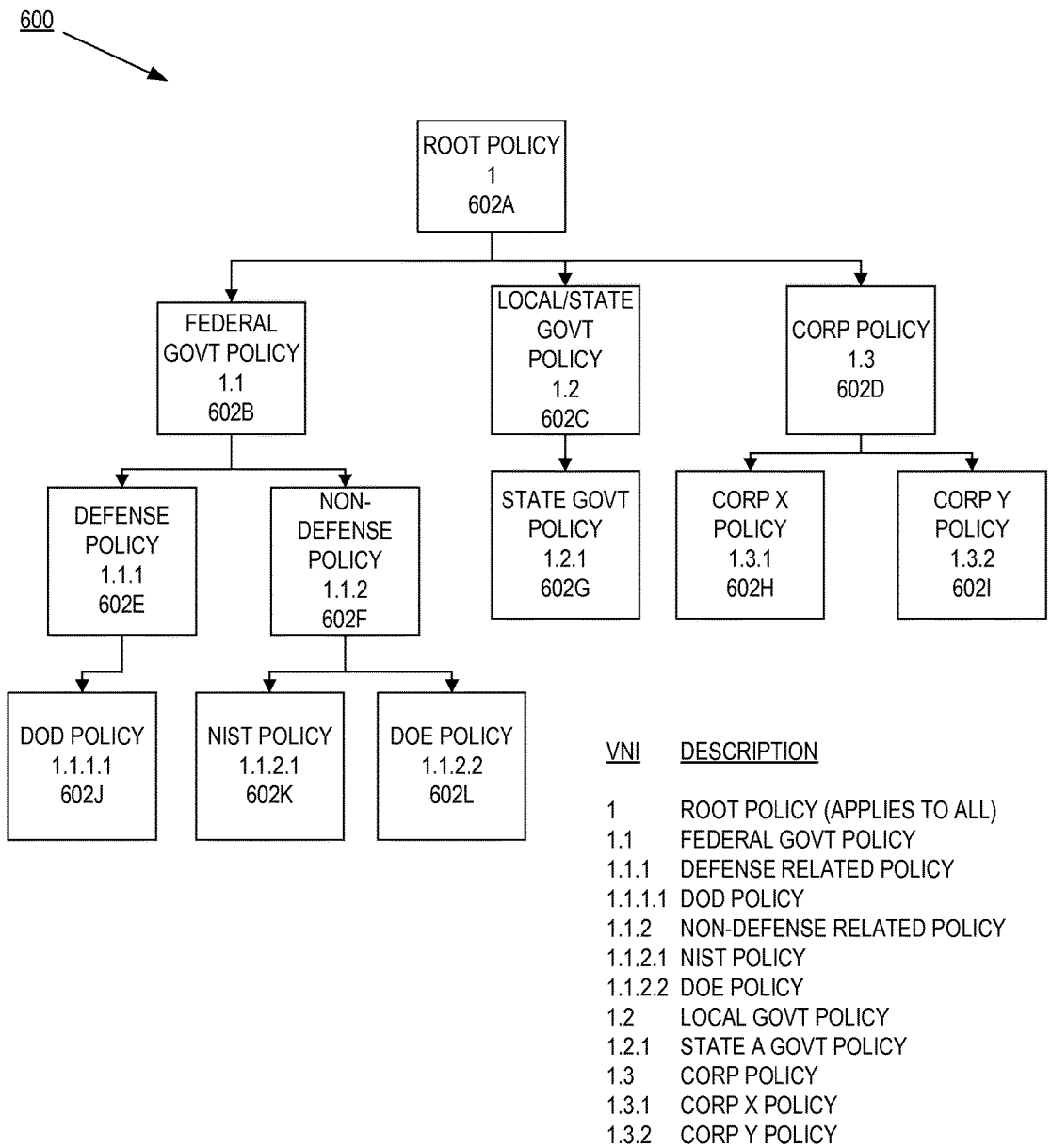
FIG. 6 is a block diagram of one embodiment of subnetted virtual network identifier policy for multiple tenants.

In addition to setting up a set of hierarchical set of policies for a single entity (such as the corporation example in FIG. 5), hierarchical policies can be set up to support different VXLAN segments policies for different tenants. For example and in one embodiment, a service provider has different policies for different tenants, such as one set of policies for Federal government VXLAN segments, a set of policies for Local/State government policies, and different sets of policies FIG. 6 is a block diagram of one embodiment of subnetted VNI 600 for multiple tenants. In FIG. 6, In FIG. 5, the VNI is a 24-bit number and is represented as a dotted decimal of three 8-bit numbers. In one embodiment, the subnetted VNI policy 600 includes a top-level root policy 602A that is denoted as 1 and applies to the VXLAN segments with VNI in the range of 1.*.*.*. For example and in one embodiment, the root policy 602A is applied to all VXLAN segments and this policy mandates that each VXLAN segment uses a basic firewall and uses a best effort QoS to transmit network data.

The root policy 602A, additionally, includes sub-policies for Federal government policy 602B to support Federal government customers, local/state government policy 602C to support state and/or local government customers, and corporate policy 602D to support corporate customers. In one embodiment, the federal government policy 602B is denoted 1.1 and applies to VXLAN segments with a VNI in the range of 1.1.*.*. In one embodiment, a VXLAN segment with a VNI of 1.1.*.* will have the federal government policy 602B and the root policy 602A applied to network elements that participate in this VXLAN segment. For example and in one embodiment, a federal government policy 602B is to setup access control lists on the network elements that participate in these VXLAN segment. The federal government policy 602B, additionally, has further sub-policies for defense policy 602E and non-defense policy 602F.

In one embodiment, the local/state government 602C is denoted 1.2 and applies to VXLAN segments with a VNI in the range of 1.2.*.*. In one embodiment, a VXLAN segment with a VNI of 1.2.*.* will have the local/state government policy 602C and the root policy 602A applied to network elements that participate in this VXLAN segment. For example and in one embodiment, a local/state government policy 602C is to setup a certain level of logging of network data through each of these VXLAN segments. The local/state government policy 602C, additionally, includes a sub-policy that is the state government policy 602G.

In one embodiment, the corporate policy 602D is denoted 1.3 and applies to VXLAN segments with a VNI in the range of 1.3.*.*. In one embodiment, a VXLAN segment with a VNI of 1.3.*.* will have the corporate policy 602D and the root policy 602A applied to network elements that participate in this VXLAN segment. For example and in one embodiment, a corporate policy 602D is to impose a PCI compliance for the corporate VXLAN segments. The corporate policy 602D, additionally, includes sub-policies for corporate X policy 602H and corporate Y policy 602I.

In one embodiment, the defense policy 602E is denoted 1.1.1 and applies to VXLAN segments with a VNI in the range of 1.1.1.*. In one embodiment, a VXLAN segment with a VNI of 1.1.1.* will have the defense policy 602E, the federal government policy 602B, and the root policy 602A applied to network elements that participate in this VXLAN segment. For example and in one embodiment, a defense policy 602E is to setup additional security (above what is required by the federal government policy 602B or the root policy 602A) on the network elements that participate in these VXLAN segments. The defense policy 602E, additionally, includes a sub-policy for the Department of Defense policy 602J.

In one embodiment, the non-defense policy 602F is denoted 1.1.2 and applies to VXLAN segments with a VNI in the range of 1.1.2.*. In one embodiment, a VXLAN segment with a VNI of 1.1.2.* will have the non-defense policy 602F, the federal government policy 602B, and the root policy 602A applied to network elements that participate in this VXLAN segment. For example and in one embodiment, a non-defense policy 602F is to setup additional logging for these VXLAN segments. The non-defense policy 602F, additionally, includes sub-policies for the National Institute of Standards and Technology policy 602K and the Department of Energy Policy 602L.

In one embodiment, the corporate X policy 602H is a set of policies for corporation X and is denoted 1.3.1, which applies to VXLAN segments with a VNI in the range of 1.3.1.*. In one embodiment, a VXLAN segment with a VNI of 1.3.1.* is a VXLAN segment associated with corporation X and will have the corporate X policy 602H, corporate policy 602D, and root policy 602A applied to the network elements that are configured to communicated network data over this VXLAN segment. For example and in one embodiment, a corporate X policy 602H can be a policy that imposes a certain service level agreement for these VXLAN segments (e.g., 99.99999% uptime).

In one embodiment, the corporate Y policy 602I is a set of policies for corporation Y VXLAN segments and is denoted 1.3.2, which applies to VXLAN segments with a VNI in the range of 1.3.2.*. In one embodiment, a VXLAN segment with a VNI of 1.3.2.* is a VXLAN segment associated with corporation Y and will have the corporate Y policy 602I, corporate policy 602D, and root policy 602A applied to the network elements and ports that are configured to communicated network data over this VXLAN segment. In one embodiment, the corporate Y policy can be the same, different, or overlap some of the network policy elements as the corporate X policy 602H. For example and in one embodiment, a corporate Y policy 602I can be a policy that imposes a certain service level agreement for these VXLAN segments (e.g., 99.99999% uptime) and minimum bandwidth guarantees (e.g., five gigabits/second).

In one embodiment, the Department of Defense policy 602J is a set of policies for Department of Defense VXLAN segments and is denoted 1.1.1.1, which applies to VXLAN segments with a VNI equal to 1.1.1.1. In one embodiment, a VXLAN segment with a VNI of 1.1.1.1 is a VXLAN segment associated with the department of defense and will have the Department of Defense policy 602J, defense policy 602E, federal government policy 602B, and root policy 602A applied to the network elements and ports that are configured to communicated network data over this VXLAN segment. For example and in one embodiment, a Department of Defense policy 602J can be a policy that mandates that block certain specific traffic patterns.

In one embodiment, the National Institute of Standards and Technology policy 602K is a set of policies for National Institute of Standards and Technology VXLAN segments and is denoted 1.1.2.1, which applies to VXLAN segments with a VNI equal to 1.1.2.1. In one embodiment, a VXLAN segment with a VNI of 1.1.2.1 is a VXLAN segment associated with the National Institute of Standards and Technology and will have the National Institute of Standards and Technology 602K, non-defense policy 602F, federal government policy 602B, and root policy 602A applied to the network elements and ports that are configured to communicated network data over this VXLAN segment. For example and in one embodiment, a National Institute of Standards and Technology policy 602K can be a policy that imposes certain forwarding decisions.

In one embodiment, the Department of Energy policy 602L is a set of policies for Department of Energy VXLAN segments and is denoted 1.1.2.1, which applies to VXLAN segments with a VNI equal to 1.1.2.1. In one embodiment, a VXLAN segment with a VNI of 1.1.2.1 is a VXLAN segment associated with the Department of Energy and will have the Department of Energy policy 602L, non-defense policy 602F, federal government policy 602B, and root policy 602A applied to the network elements and ports that are configured to communicated network data over this VXLAN segment. For example and in one embodiment, a Department of Energy policy 602L can be a policy that states that changes to the VXLAN network access devices can be made during a certain time range.

Figure 7:
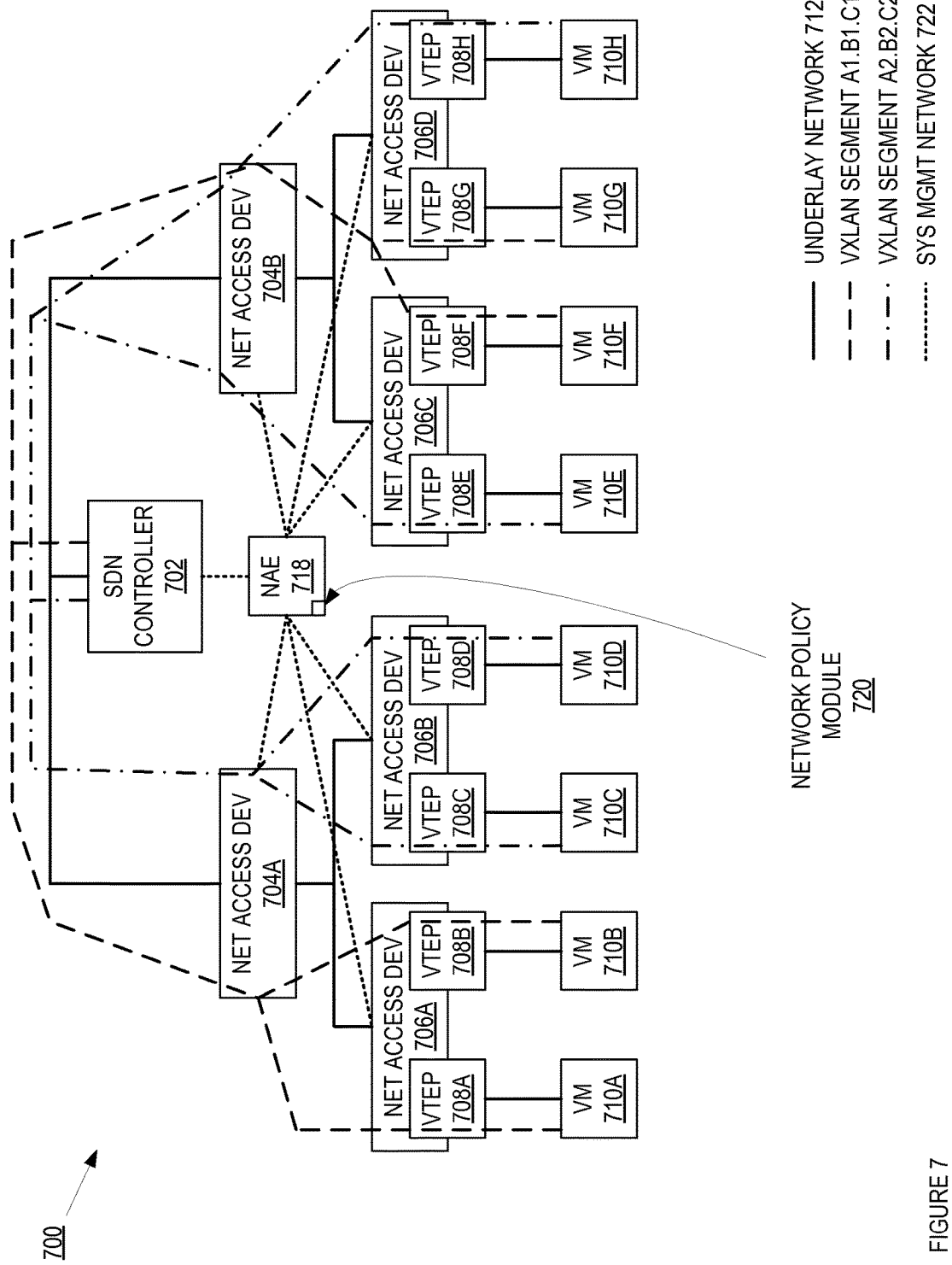
FIG. 7 is a block diagram of one embodiment of a system that includes dynamic virtualized networks overlaid on an underlay physical network, where different segments of the dynamic virtualized networks are identified with a dotted virtual network identifier.

FIG. 7 is a block diagram of one embodiment of a system 700 that includes dynamic virtualized networks that are overlaid on an underlay physical network, where different segments of the dynamic virtualized networks are identified with a dotted virtual network identifier. In one embodiment, the underlying network 712 and VXLAN segments 714A-B are similar as described in FIG. 1 above. In one embodiment, the underlying network 712 includes network access device 704A that is coupled to network access devices 704B and network access devices 706A-B. In addition, network access device 704B is coupled to network access devices 706C-D. As in FIG. 1, underlying network 712 can be a layer 3 network or a mixture of layer 2 and 3 networks. Overlaid on network 712 is VXLAN segments 714A-B. In one embodiment, the VNI for the VXLAN segment are in dotted decimal notation. For example and in one embodiment, the VXLAN segment 714A has the VNI A1.B1.C1 and the VXLAN segment 714B has the VNI A2.B2.C2. In one embodiment, VXLAN segment 714A couples VMs 710A, 710B, 710F, and 710G so that these VMs can communicate using a layer 2 protocol. In this embodiment, VMs 710A-B couple to network access device 706A via VTEP 708A-B, respectively. In addition, VM 710F couples to network access device 706C via VTEP 708F and VM 710G couples to VTEP 708G on network access device 706D. By coupling VMs 710A, 710B, 710F, and 710G using VXLAN segment 714A, these VMs can communicate using a layer 2 protocol over a local or wide area network. In one embodiment, the network data communicated using VXLAN segment 714A is encapsulated with a header that includes the VNI associated with VXLAN segment 714A.

In one embodiment, VXLAN segment 714B couples VMs 710C, 710D, 710E, and 710H so that these VMs can communicate using a layer 2 protocol. In this embodiment, VMs 710C-D couple to network access device 706B via VTEP 708C-D, respectively. In addition, VM 710E couples to network access device 706C via VTEP 708E and VM 710H couples to VTEP 708H on network access device 706D. By coupling VMs 710C, 710D, 710E, and 710H using VXLAN segment 714B, these VMs can communicate using a layer 2 protocol over a local or wide area network. In one embodiment, the network data communicated using VXLAN segment 714B is encapsulated with a header that includes the VNI associated with VXLAN segment 714B. In addition, system 700 includes a SDN controller 702 that is a device that includes the VTEP configurations for each VXLAN segment.

In order to determine a policy for each of the VXLAN segments 714A-B, system 700 includes a network automation engine (NAE) 718 that determines a policy for each of these VXLAN segments 714A-B based on a corresponding VNI of that VXLAN segment. In one embodiment, the VNI is a dotted decimal number, where each of the dotted decimals may correspond to a policy for the VXLAN. As is described above with reference to FIGS. 5 and 6, one or more policies from a set of hierarchical policies may apply to each of the VXLAN segments 714A-B. In this embodiment, the NAE 718 determines which policies apply based on the VNI of each VXLAN segment 714A-B. Determining which policies apply for a VXLAN segments is further described in FIGS. 8-10 below.

In another embodiment, the NAE 718 is part of the SDN Controller 302. In this embodiment, the NAE 718 can communicate with the network access devices 704A-B and 706A-D via the system management network 722 and/or via the underlying network 712. In one embodiment, the NAE 718 includes network policy module 720 to determine one or more policies for the VXLAN segments 714A-B based on the corresponding VNI of the VXLAN segment. While the system 700 in FIG. 7 is described in reference a VXLAN network, the invention described herein can be used for other virtualized networks (e.g., NVGRE, STT, and OTV). In one embodiment, the network policy module 720 can further map one of the VNI of the VXLAN segments 714A-B to another VNI using a table.

Figure 8:
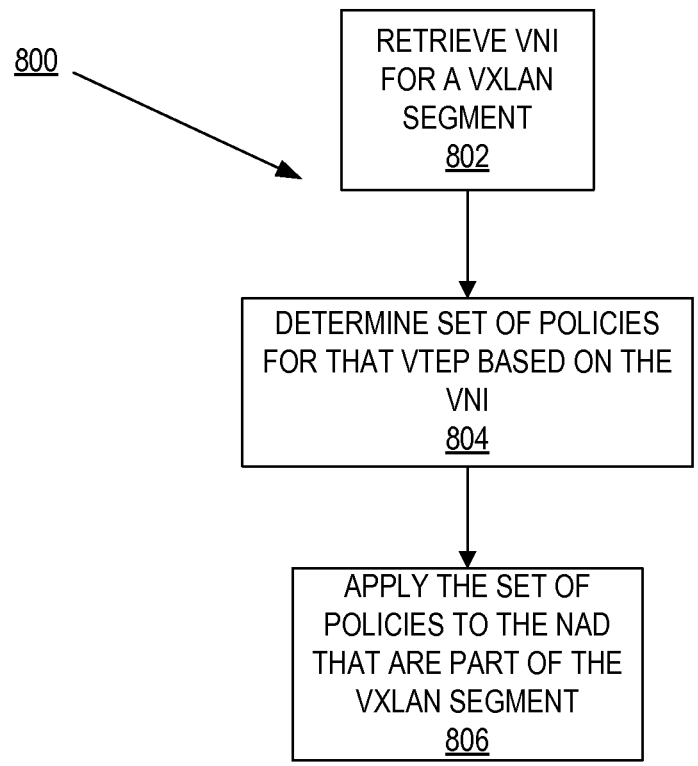
FIG. 8 is a flow diagram of one embodiment of a process to determine and apply a set of policies based on a dotted virtual network identifier.

As described above, the network automation engine 720 can determine a set of policies that are to be applied for a VXLAN segment based on the VNI of that VXLAN segment. FIG. 8 is a flow diagram of one embodiment of a process 800 to determine and apply a set of policies based on a dotted virtual network identifier. In one embodiment, process 800 is performed by a network policy module to determine and apply a set of policies for a VXLAN segment based on a dotted VNI of the VNI segment, such as the network policy module 720 of FIG. 7 described above. In FIG. 8, process 800 begins by retrieving a VNI for a VXLAN segment. In one embodiment, process 800 communicates with the SDN controller to retrieve the VNI for a VXLAN segment, such as SDN controller 702 of FIG. 7 above. At block 804, process determines a matching set of policies for that VXLAN segment based on the VNI for that VXLAN segment. In one embodiment, process 800 applies one or more masks to the VNI, where each of the masks corresponds to one of the policies from a set of possible policies. In this embodiment, for each matching policy, process 800 adds them to the matching set of policies. In one embodiment, there can be one or more matching masks for the VNI. For example and in one embodiment, if the set of possible policies is as outlined in FIG. 5 above, process 800 would determine that the trading server policy 502E, server policy 502C, and root policy 502A are matches for a VNI of 1.2.1. Determining a matching set of policies is further described in FIG. 9 below. Process 800 applies this matching set of policies to the network access devices that are part of the VXLAN segment at block 806. For example and in one embodiment, for the VXLAN segment 714B, process 800 would apply the matching set of policies to network access devices 704A-B and 706B-D. In one embodiment, these matching policies can be applied to ports that are configured as a VTEP, to ports that otherwise participate in the VXLAN segment, to ports that do not participate in the VXLAN, and/or to the network access device of the VXLAN in general. In one embodiment, these matching policies may apply to a network access device of the VXLAN in general.

Figure 9:
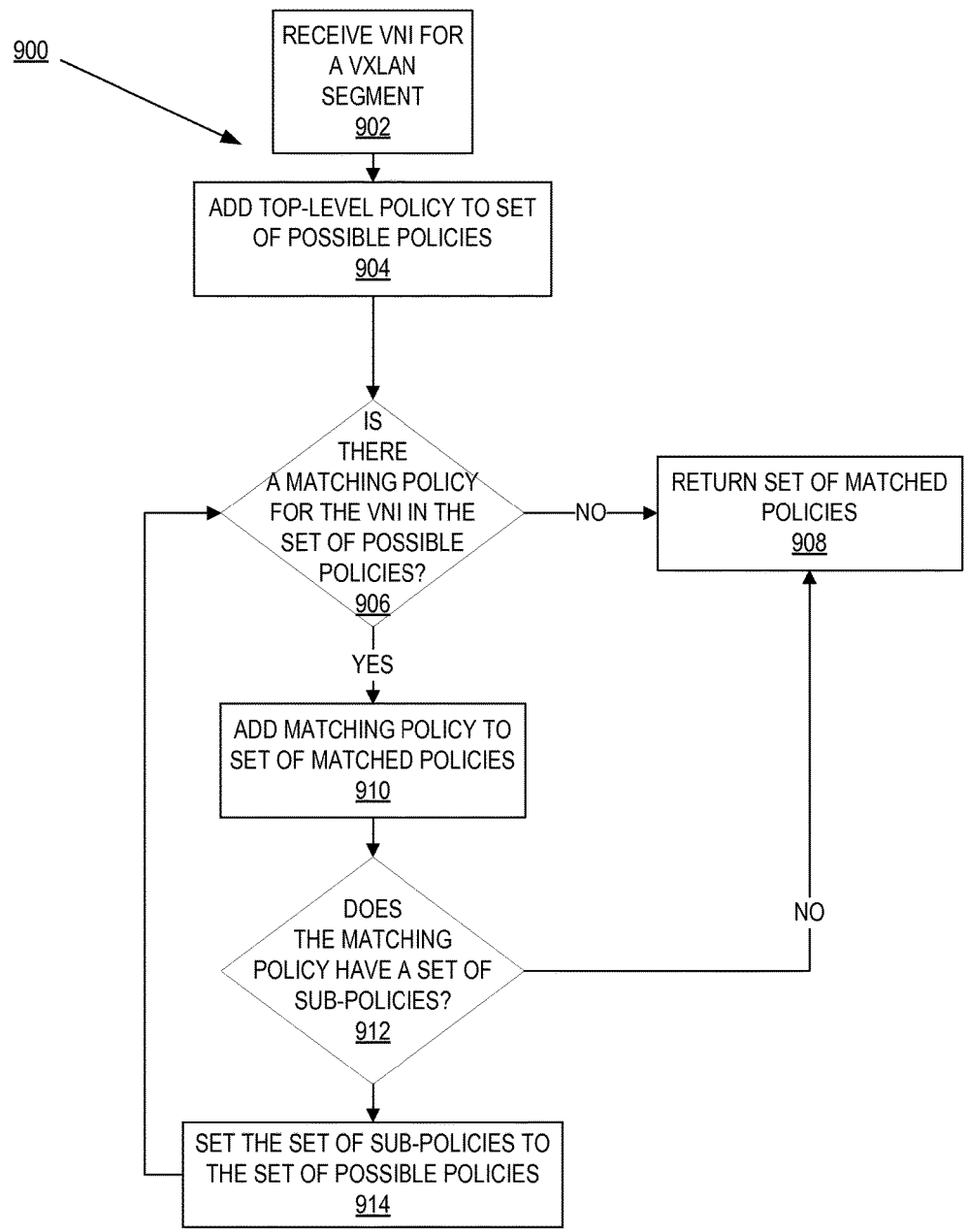
FIG. 9 is a flow diagram of one embodiment of a process to determine a set of policies based on a dotted virtual network identifier.

FIG. 9 is a flow diagram of one embodiment of a process 900 to determine a set of policies based on a dotted decimal VNI of a VXLAN segment. In one embodiment, process 900 is performed by process 800 to determine a set of matching policies based on a dotted VNI as described in FIG. 8 at block 804 above. In FIG. 9, process 900 begins by receiving a VNI for a VXLAN segment at block 902. In one embodiment, process 900 retrieves the VNI of a VXLAN segment by communicating with a SDN controller, such SDN controller 702 of FIG. 9 above. At block 904, process 900 adds the top-level policy to the set of possible policies. In one embodiment, the top-level policy is the root policy, such as root policy 502A of FIG. 5 or root policy 602A of FIG. 6 described above. In one embodiment, the set of possible policies is the set of policies that are used by process 900 to determine if there is a match for the input VNI.

At block 906, process 900 determines if there is a matching policy for the VNI in the set of possible policies. In one embodiment, process 900 applies a mask associated with each of the different set of possible policies to the VNI to determine if there is a matching policy. In one embodiment, the root policy of a hierarchical set of policies matches each VNI, such as root policy 502A of FIG. 5 or root policy 602A of FIG. 6 above. In another embodiment, process 900 iterates over a set of possible policies to determine if there is a match for the VNI. For example and in one embodiment, if the set of possible polices is the desktop policy 502B and the server policy 502C of FIG. 5 above, process 900 iterates over these two policies 502B and 502C to determine if there is a match for either policy. In this embodiment, for each of the two policies, process 900 applies a mask corresponding to each policy to the VNI to determine a match. Applying a mask to a VNI to determine a matching policy is further described in FIG. 10 below.

If there is no matching policy in the set of possible policies for the VNI, execution proceeds to block 908 below. If there is a matching policy for the VNI, process 900 adds this matching policy to the set of matched policies at block 910. In one embodiment, the set of matched policies is the set of policies that match the VNI for the VXLAN segment. For example and in one embodiment, if the VNI is 1.1.3 and process 900 is using the set of policies illustrated in FIG. 5, the set of matched policies would be the root policy 502A and the desktop policy 502B. At block 912, process 900 determines if the matching policy has any sub-policies. In one embodiment, a policy can have one or more sub-policies. In one embodiment, a root policy may have one or more sub-policies. For example and in one embodiment, the root policy 502A of FIG. 5 has the desktop policy 502B and the server policy 502C as sub-policies. As another example and another embodiment, the root policy 602A of FIG. 6 has the Federal government policy 602B, the local/state government policy 602C, and the corporate policy 602D as sub-policies. If there are sub-policies, process 900 sets these sub-policies as the set of possible policies at block 914. Execution proceeds to block 906 above. If there are no sub-policies, execution proceeds to block 908. At block 908, process 900 returns the set of matching policy.

Figure 10:
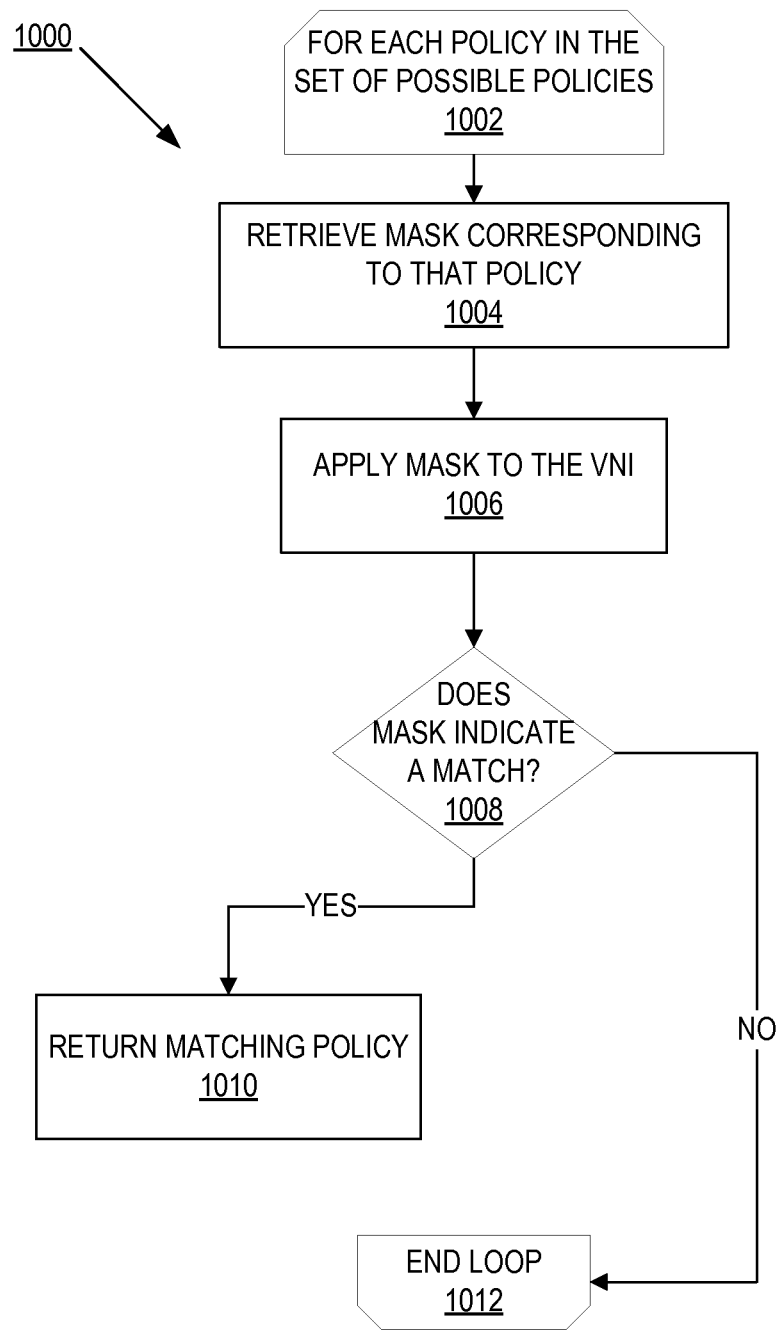
FIG. 10 is a flow diagram of one embodiment of a process to determine if a policy matches a dotted virtual network identifier based on using a mask that corresponds to that policy.

FIG. 10 is a flow diagram of one embodiment of a process 1000 to determine if a policy matches a dotted VNI based on using a mask that corresponds to that policy. In one embodiment, process 1000 is performed by process 900 to determine if a policy matches a dotted VNI based on using a mask as described in FIG. 9 at block 906 above. In FIG. 10, process 1000 begins by executing a processing loop (blocks 1002-1012) to determine a matching policy from a set of possible policies for a VNI. At block 1004, process 1000 retrieves the mask corresponding to one of the possible policies. In one embodiment, a mask is a bit pattern that corresponds to the VNI for this possible policy and is used to determine whether this possible policy is a match for the input VNI. At block 1006, process 1000 applies the mask to the VNI to determine if there is a match. In one embodiment, a match is a non-zero result. At block 1008, process 1000 determines if the mask indicates a match. In one embodiment, a match is a non-zero result of applying the mask to VNI. If the mask indicates a match, process 1000 returns the matching policy at block 1010. If there is not a match, execution proceeds to block 1012, where the loop ends.

Figure 11:
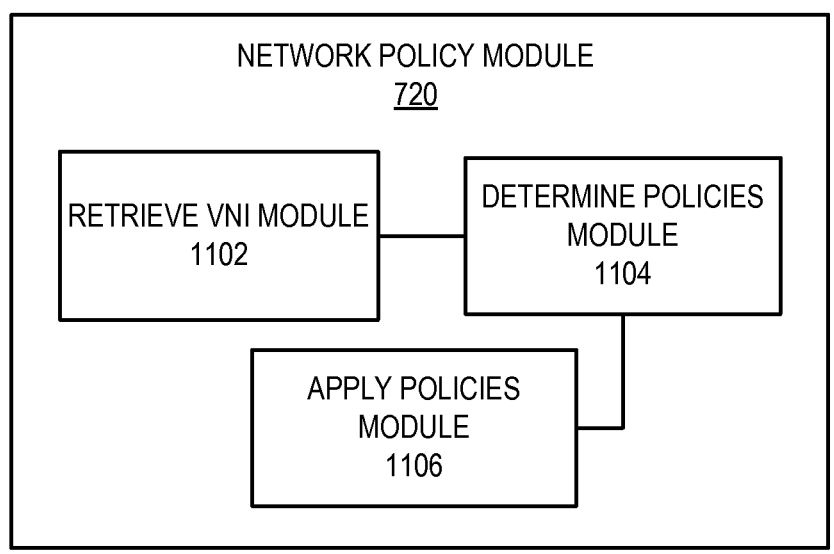
FIG. 11 is a block diagram of network policy module that determines and applies a set of policies based on a dotted virtual network identifier.

FIG. 11 is a block diagram of network policy module 720 that determines and applies a set of policies based on a dotted virtual network identifier. In one embodiment, the network policy module 720 includes a retrieve VNI module 1102, determine policies module 1104, and apply policies module 1106. In one embodiment, the retrieve VNI module 1102 retrieves a VNI for a VXLAN segment as described in FIG. 8, block 802 above. The determine policies module 1104 determines a set of policies for that VXLAN segment based on the VNI as described in FIG. 8, block 804 above. The apply policies module 1106 applies the determined set of policies as described in FIG. 8, block 806 above.

Figure 12:
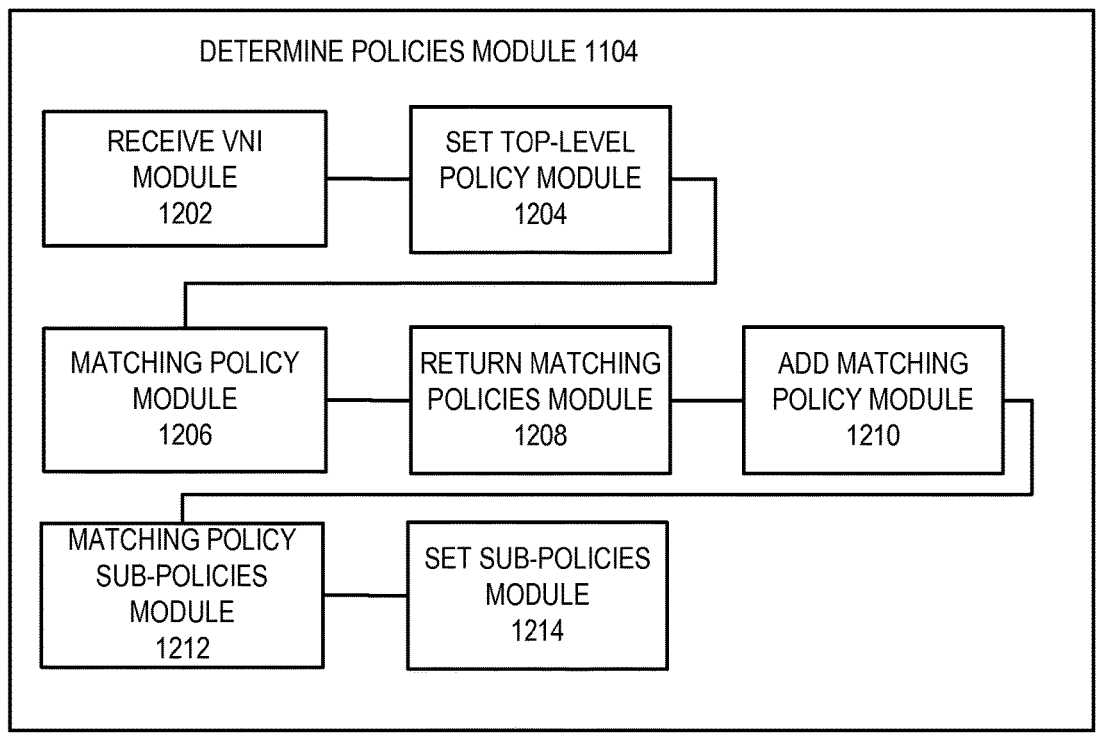
FIG. 12 is a block diagram of a determine policies module that determines if a policy matches a dotted virtual network identifier based on using a mask that corresponds to that policy.

FIG. 12 is a block diagram of a determine policies module 1104 that determines if a policy matches a dotted virtual network identifier based on using a mask that corresponds to that policy. In one embodiment, the determine policies module 1104 includes a receive VNI module 1202, set top-level policy module 1204, matching policy module 1206, return matching policy 1208, add matching policy module 1210, matching policy sub-policies module 1212, and set sub-policies module 1214. In one embodiment, the receive VNI module 1202 receives the VNI for the VXLAN segment as described in FIG. 9, block 902 above. The set top-level policy module 1204 sets the top-level policy as the set of possible policies as described in FIG. 9, block 904 above. The matching policy module 1206 determines if there is a matching policy from the set of possible policies as described in FIG. 9, block 908 above. The return matching policy 1208 returns the set of matching policies as described in FIG. 9, block 908 above. The add matching policy module 1210 adds the matching policy to the set of match policies as described in FIG. 9, block 910 above. The matching policy sub-policies module 1212 determines if the matching policy has sub-policies as described in FIG. 9, block 912 above. The set sub-policies module 1214 sets the sub-policies as the set of possible policies as described in FIG. 9, block 914 above.

Figure 13:
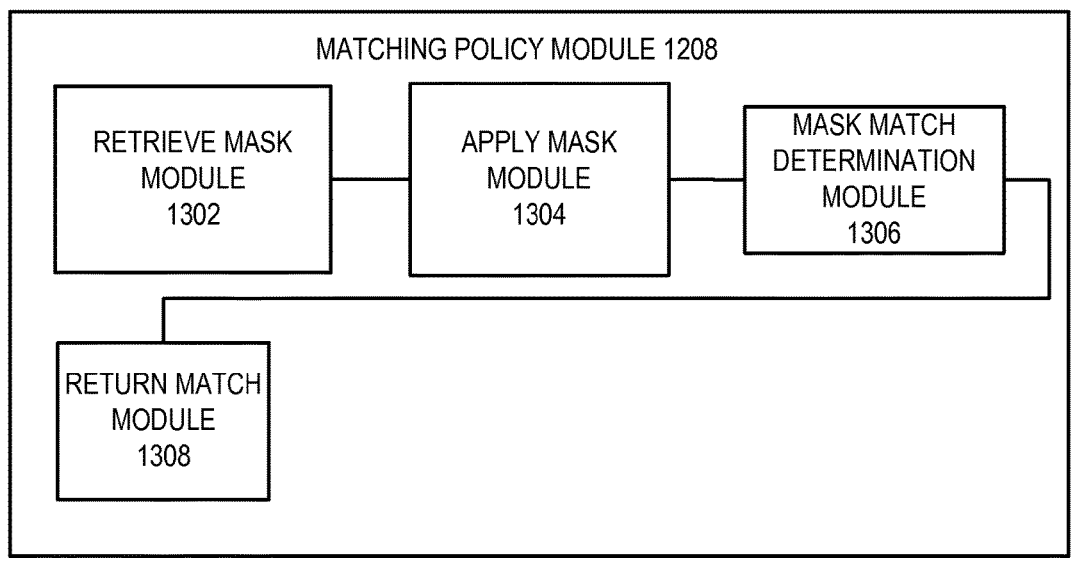
FIG. 13 is a block diagram of a matching policy module that determines if a policy matches a dotted virtual network identifier based on using a mask that corresponds to that policy.

FIG. 13 is a block diagram of a matching policy module 1208 that determines if a policy matches a dotted virtual network identifier based on using a mask that corresponds to that policy. In one embodiment, the matching policy module 1208 includes a retrieve mask module 1302, apply mask module 1304, mask match determination module 1306, and return match module 1308. In one embodiment, the retrieve mask module 1302 retrieves the mask for the policy as described in FIG. 10, block 1004 above. The apply mask module 1304 applies the mask to the VNI as described in FIG. 10, block 1006 above. The mask match determination module 1306 determines if the mask indicates a match as described in FIG. 10, block 1008 above. The return match module 1308 returns the matching policy as described in FIG. 10, block 1004 above.

Figure 14:
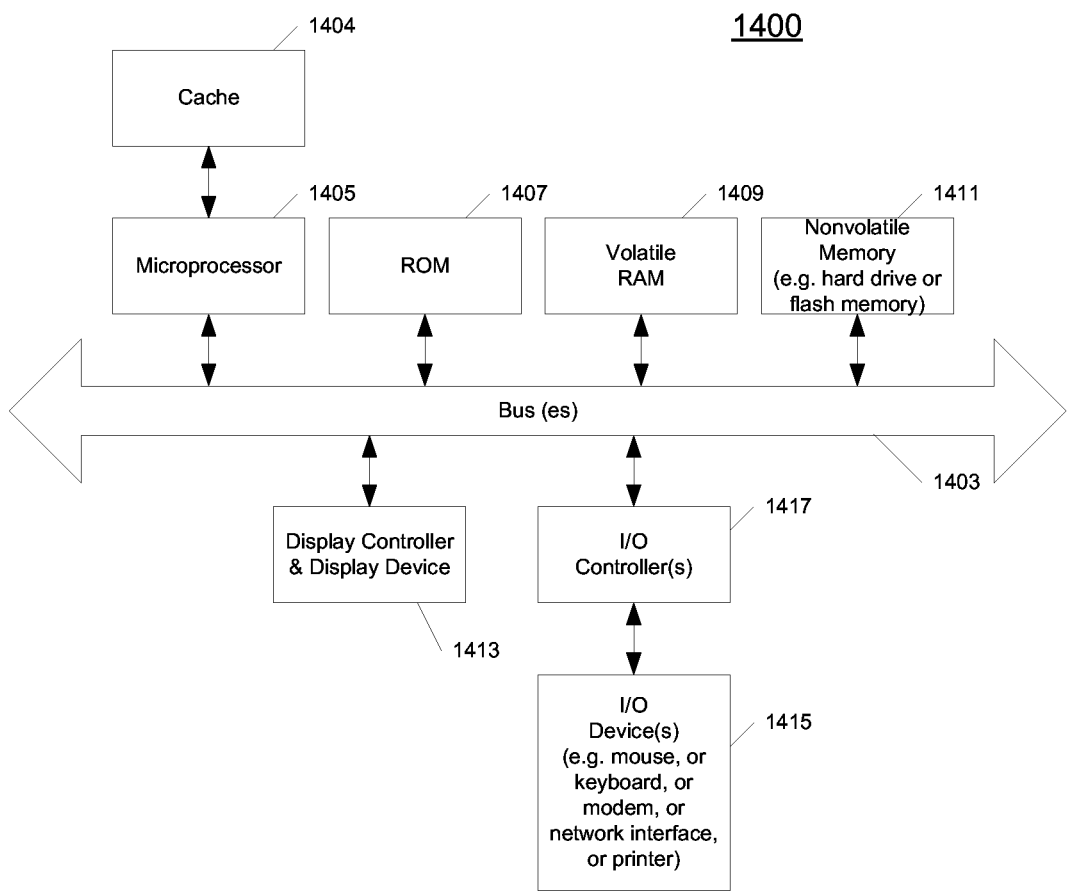
FIG. 14 illustrates one example of a typical computer system, which may be used in conjunction with the embodiments described herein.

FIG. 14 shows one example of a data processing system 1400, which may be used with one embodiment of the present invention. For example, the system 1400 may be implemented including a NAE 718 as shown in FIG. 7. Note that while FIG. 14 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 14, the computer system 1400, which is a form of a data processing system, includes a bus 1403 which is coupled to a microprocessor(s) 1405 and a ROM (Read Only Memory) 1407 and volatile RAM 1409 and a non-volatile memory 1411. The microprocessor 1405 is coupled with a cache 1404 and may retrieve the instructions from the memories 1407, 1409, 1411 and execute the instructions to perform operations described above. The bus 1403 interconnects these various components together and also interconnects these components 1405, 1407, 1409, and 1411 to a display controller and display device 1415 and to peripheral devices such as input/output (I/O) devices which may be mice, keyboards, modems, network interfaces, printers and other devices which are well known in the art. Typically, the input/output devices 1415 are coupled to the system through input/output controllers 1417. The volatile RAM (Random Access Memory) 1409 is typically implemented as dynamic RAM (DRAM), which requires power continually in order to refresh or maintain the data in the memory.

The mass storage 1414 is typically a magnetic hard drive or a magnetic optical drive or an optical drive or a DVD RAM or a flash memory or other types of memory systems, which maintain data (e.g. large amounts of data) even after power is removed from the system. Typically, the mass storage 1414 will also be a random access memory although this is not required. While FIG. 14 shows that the mass storage 1414 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1403 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "retrieving," "receiving," "determining," "applying," "sending," "forwarding," "detecting," "adding," "communicating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method comprising:
    maintaining, by a network policy module of a network automation engine associated with a dynamic virtualized network, a set of hierarchical policies, wherein each policy of the set of hierarchical policies specifies how network data for a corresponding segment of a plurality of segments of the dynamic virtualized network is to be processed and wherein the set of hierarchical policies include a top-level root policy that is applicable to all of the plurality of segments and sub-policies that are additionally applicable to corresponding tenants of a plurality of tenants or to corresponding categories of a plurality of categories of computer systems associated with the corresponding segments;
    retrieving, by the network policy module, a virtual network identifier of a segment of the plurality of segments of the dynamic virtualized network, wherein the virtual network identifier includes a plurality of bits defining a plurality of hierarchical subnets of the virtual network identifier, each of the plurality of hierarchical subnets is represented by a different subset of the plurality of bits, the dynamic virtualized network is a virtualized layer 2 network that is overlaid on a layer 3 physical network, the layer 3 physical network includes a plurality of network access devices, and the segment includes a plurality of tunnel endpoints;
    determining, by the network policy module, a plurality of matching policies for the segment based on the plurality of hierarchical subnets of the virtual network identifier by identifying and aggregating those of the set of hierarchical policies applicable to each of the plurality of hierarchical subnets, wherein each of the plurality of hierarchical subnets corresponds to at least one of the plurality of matching policies; and
    applying, by the network policy module, the plurality of matching policies to each network access device of the plurality of network access devices that corresponds to one of the plurality of tunnel endpoints.

2. The method of claim 1, wherein the dynamic virtualized network is a Virtual eXtensible Local Area Network.

3. The method of claim 1, wherein the virtual network identifier is represented by a dotted collection of the plurality of subnets.

4. The method of claim 1, wherein one of the plurality of subnets is a top-level net and others of the plurality of subnets are subnets of the top-level net.

5. The method of claim 1, wherein the determining the plurality of matching policies comprises:
    determining a policy match for each of the plurality of subnets from a set of possible policies.

6. The method of claim 5, wherein the determining the policy match comprises:
    for each of the plurality of subnets,
        applying a policy mask that corresponds to one of set of possible policies to the virtual network identifier, wherein the set of possible policies correspond to that subnet, and
        adding the one of the set of possible policies to the plurality of matching policies if the policy mask indicates a match.

7. The method of claim 5, wherein the set of possible policies is a set of sub-policies of one of the plurality of matching policies.

8. The method of claim 1, wherein the virtual network identifier is a Virtual eXtensible Local Area Network Network Identifier.

9. The method of claim 1, wherein a network access device is selected from the group consisting of a switch and a router.

10. A non-transitory machine-readable medium having executable instructions to cause one or more processing units to perform a method of determining a plurality of matching policies for a segment of a plurality of segments of a dynamic virtualized network, the method comprising:
   maintaining, by a network policy module of a network automation engine associated with the dynamic virtualized network, a set of hierarchical policies, wherein each policy of the set of hierarchical policies specifies how network data for a corresponding segment of the plurality of segments is to be processed and wherein the set of hierarchical policies include a top-level root policy that is applicable to all of the plurality of segments and sub-policies that are additionally applicable to corresponding tenants of a plurality of tenants or to corresponding categories of a plurality of categories of computer systems associated with the corresponding segments;
   retrieving, by the network policy module, a virtual network identifier of the segment of the dynamic virtualized network, wherein the virtual network identifier includes a plurality of bits defining a plurality of hierarchical subnets of the virtual network identifier, each of the plurality of hierarchical subnets is represented by a different subset of the plurality of bits, the dynamic virtualized network is a virtualized layer 2 network that is overlaid on a layer 3 physical network, the layer 3 physical network includes a plurality of network access devices, and the segment includes a plurality of tunnel endpoints;
   determining, by the network policy module, a plurality of matching policies for the segment based on the plurality of hierarchical subnets of the virtual network identifier by identifying and aggregating those of the set of hierarchical policies applicable to each of the plurality of hierarchical subnets, wherein each of the plurality of hierarchical subnets corresponds to at least one of the plurality of matching policies; and
   applying, by the network policy module, the plurality of matching policies to each network access device of the plurality of network access devices that corresponds to one of the plurality of tunnel endpoints.

11. The non-transitory machine-readable medium of claim 10, wherein the dynamic virtualized network is a Virtual eXtensible Local Area Network.

12. The non-transitory machine-readable medium of claim 10, wherein the virtual network identifier is represented by a dotted collection of the plurality of subnets.

13. The non-transitory machine-readable medium of claim 10, wherein one of the plurality of subnets is a top-level net and others of the plurality of subnets are subnets of the top-level net.

14. The non-transitory machine-readable medium of claim 10, wherein the determining the plurality of matching policies comprises:
   determining a policy match for each of the plurality of subnets from a set of possible policies.

15. The non-transitory machine-readable medium of claim 14, wherein the determining the policy match comprises:
   for each of the plurality of subnets,
      applying a policy mask that corresponds to one of set of possible policies to the virtual network identifier, wherein the set of possible policies correspond to that subnet, and
      adding the one of the set of possible policies to the plurality of matching policies if the policy mask indicates a match.

16. A system to determine a plurality of matching policies for a segment of a plurality of segments of a dynamic virtualized network, the system comprising:
   a plurality of network access devices;
   a layer 3 physical network interconnecting the plurality of network access devices;
   the dynamic virtualized network, wherein the dynamic virtualized network is a virtualized layer 2 network that is overlaid on the layer 3 physical network and the segment includes a plurality of tunnel endpoints; and
   a network automation element, coupled to the plurality of network access elements, wherein the network automation element:
      maintains a set of hierarchical policies, wherein each policy of the set of hierarchical policies specifies how network data for a corresponding segment of the plurality of segments is to be processed and wherein the set of hierarchical policies include a top-level root policy that is applicable to all of the plurality of segments and sub-policies that are additionally applicable to corresponding tenants of a plurality of tenants or to corresponding categories of a plurality of categories of computer systems associated with the corresponding segments,
      retrieves a virtual network identifier of the segment of the dynamic virtualized network, wherein the virtual network identifier includes a plurality of bits defining a plurality of hierarchical subnets of the virtual network identifier, each of the plurality of hierarchical subnets is represented by a different subset of the plurality of bits,
      determines the plurality of matching policies for the segment based on the plurality of hierarchical subnets of the virtual network identifier by identifying and aggregating those of the set of hierarchical policies applicable to each of the plurality of hierarchical subnets, and
      applies the plurality of matching policies to each network access device of the plurality of network access devices that corresponds to at least one of the plurality of tunnel endpoints, wherein each of the plurality of subnets corresponds to a different one of the plurality of matching policies.

17. The system of claim 16, wherein the dynamic virtualized network is a Virtual eXtensible Local Area Network.

18. The system of claim 16, wherein the virtual network identifier is represented by a dotted collection of the plurality of subnets.

19. The system of claim 16, wherein one of the plurality of subnets is a top-level net and others of the plurality of subnets are subnets of the top-level net.

20. The system of claim 16, wherein the virtual network identifier is a Virtual eXtensible Local Area Network Network Identifier.

* * * * *